C. B. SREEVES.
Churns.

No. 157,702.  Patented Dec. 15, 1874.

Witnesses:
J. D. Kerfoot
F. O. S. Howe

Inventor:
Charles B. Sreeves

THE GRAPHIC CO. PHOTO-LITH. 39 & 41 PARK PLACE, N.Y.

UNITED STATES PATENT OFFICE.

CHARLES B. SREEVES, OF DALLAS, TEXAS.

IMPROVEMENT IN CHURNS.

Specification forming part of Letters Patent No. 157,702, dated December 15, 1874; application filed August 15, 1874.

*To all whom it may concern:*

Figure 1:
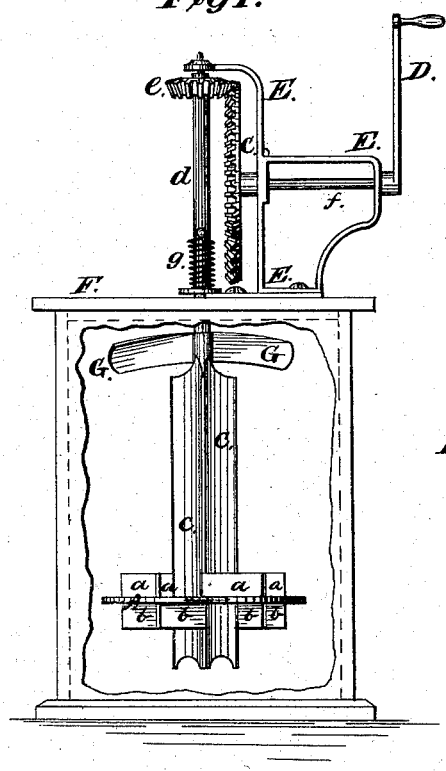

Be it known that I, CHARLES B. SREEVES, of Dallas, State of Texas, have invented a Churning-Machine, of which the following is a specification:

The object of my invention is to combine in a churning-machine suitable mechanism which shall easily and rapidly convert cream into butter; and my invention consists in a circular dasher, A, provided with ribs *a* upon the top side, radiating from the center, which, when the dasher is revolved in the direction indicated by the arrow, throws the cream toward the center; and upon the bottom side are ribs *b*, of similar size and shape, set at an opposite angle, to throw the cream from the center of the churn. The dash is provided with an opening, B, through which passes the fluted part *c* of the dash-stem. The fluted part, when made of metal, will be hollow; and if the cream, when placed in the churn, is too warm or too cold, it may be filled from the bottom with hot or cold water and brought to the desired temperature. Just above these flutes are secured two blades or fans, G G. The same are curved downward, and force the atmosphere within the churn downward, causing it to mix freely with the cream. The top part *d* of the dash-stem is round, and near the end is secured a bevel-pinion, *e*. This pinion receives motion from a bevel-wheel, C, that is secured to a shaft, *f*, all of which are driven by a crank, D, and supported by a bracket, E, that is firmly secured to the churn-cover, as clearly shown in the side view, Figure 1, of the accompanying drawing.

Figure 2:
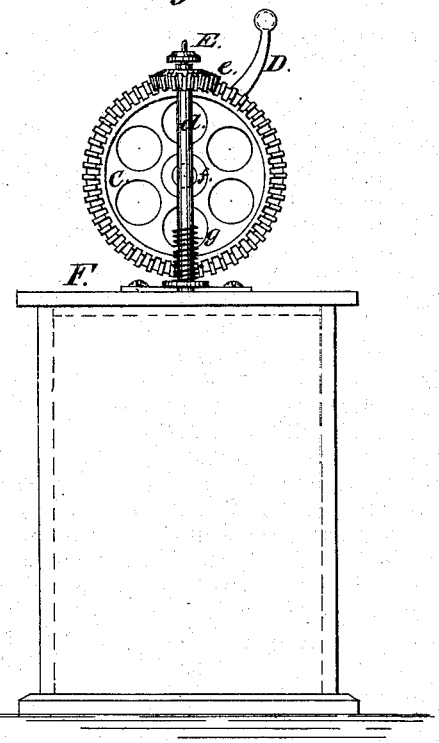
Figure 4:
Figure 3:
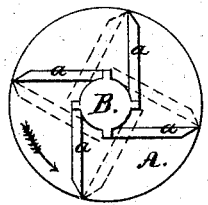

The machine is also illustrated in the front elevation, Fig. 2, in which it has not been deemed necessary to show the dasher and stem, as they are shown in detail by the sketches, Figs. 3 and 4.

I am aware that churns have been made square, round, and in many other forms; therefore I do not claim any particular style for the churn proper, as it will be readily seen that my dasher and driving mechanism can be easily attached to the cover of any common churn, whether round or square. In a round churn, however, it will be necessary to have one or more strips of wood or metal, of suitable width, extending from the bottom to near the top. The same may be perforated with holes, which will tend to break the cream and prevent its rotating with the dasher.

It will also be observed that when the cover is lifted from the churn the dasher and other mechanism are removed with it, thus leaving the inside of the churn clear of everything that would interfere with the easy and convenient gathering of the butter.

The spring *g* around the dash-stem *d* admits of the same being raised and detached from the bracket E, and this stem, with dasher removed, has been found very useful in practice for gathering the butter by hand. As the dasher revolves in the direction of the arrow the ribs create a vacuum near the bottom of the churn, and the dash-stem, being fluted, admits of the atmosphere passing down and mixing with the cream, and the result is the speedy separation of all the particles of butter.

Having thus described all that is necessary for a full understanding of my invention, what I claim as new, and desire to secure by Letters Patent, is—

In a churn, the apparatus herein specified, consisting of the fan G, fluted stem *c*, and ribbed dasher A *a*, substantially as described.

C. B. SREEVES.

Witnesses:
J. D. KERFOOT,
F. O. S. HOWE.